United States Patent
Grasso et al.

(10) Patent No.: US 6,916,571 B2
(45) Date of Patent: Jul. 12, 2005

(54) PEM FUEL CELL PASSIVE WATER MANAGEMENT

(75) Inventors: Albert P. Grasso, Vernon, CT (US); Glenn W. Scheffler, Tolland, CT (US); Leslie L. Van Dine, Manchester, CT (US); Brian F. Dufner, West Hartford, CT (US); Richard D. Breault, North Kingstown, RI (US)

(73) Assignee: UTC Fuel Cells, LLC, South Windsor, CT (US)

( * ) Notice: Subject to any disclaimer, the term of this patent is extended or adjusted under 35 U.S.C. 154(b) by 95 days.

(21) Appl. No.: 10/465,006

(22) Filed: Jun. 19, 2003

(65) Prior Publication Data

US 2004/0258973 A1 Dec. 23, 2004

(51) Int. Cl.[7] .............................. H01M 2/14; H01M 2/36
(52) U.S. Cl. ............................... 429/34; 429/38; 429/72
(58) Field of Search .............................. 429/36, 38, 39, 429/13, 71, 72

(56) References Cited

U.S. PATENT DOCUMENTS

| | | | |
|---|---|---|---|
| 5,503,944 A | 4/1996 | Meyer et al. | |
| 5,700,595 A | 12/1997 | Reiser | |
| 5,853,909 A | 12/1998 | Reiser | |
| 6,306,530 B1 | * 10/2001 | Blondin et al. | ............ 429/13 |
| 6,355,368 B1 | * 3/2002 | Kralick | ............ 429/26 |

* cited by examiner

Primary Examiner—Patrick Joseph Ryan
Assistant Examiner—Julian Mercado
(74) Attorney, Agent, or Firm—M. P. Williams

(57) ABSTRACT

Water flow field inlet manifolds (33, 37) are disposed at the fuel cell stack (11) base. Water flow field outlet manifolds (34, 38) are located at the fuel cell stack top. Outlet and inlet manifolds are interconnected (41–43, 47, 49, 50) so gas bubbles leaking through the porous water transport plate cause flow by natural convection, with no mechanical water pump. Variation in water level within a standpipe (58) controls (56, 60, 62, 63) the temperature or flow of coolant. In another embodiment, the water is not circulated, but gas and excess water are vented from the water outlet manifolds. Water channels (70) may be vertical. A hydrophobic region (80) provides gas leakage to ensure bubble pumping of water. An external heat exchanger (77) maximizes water density differential for convective flow.

7 Claims, 6 Drawing Sheets

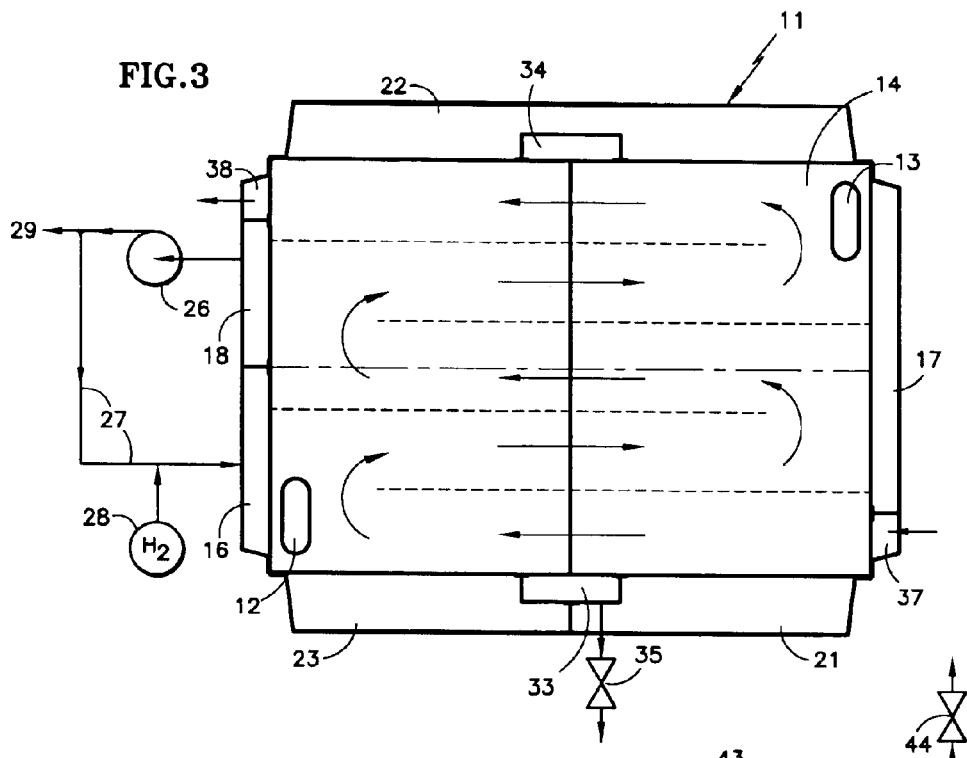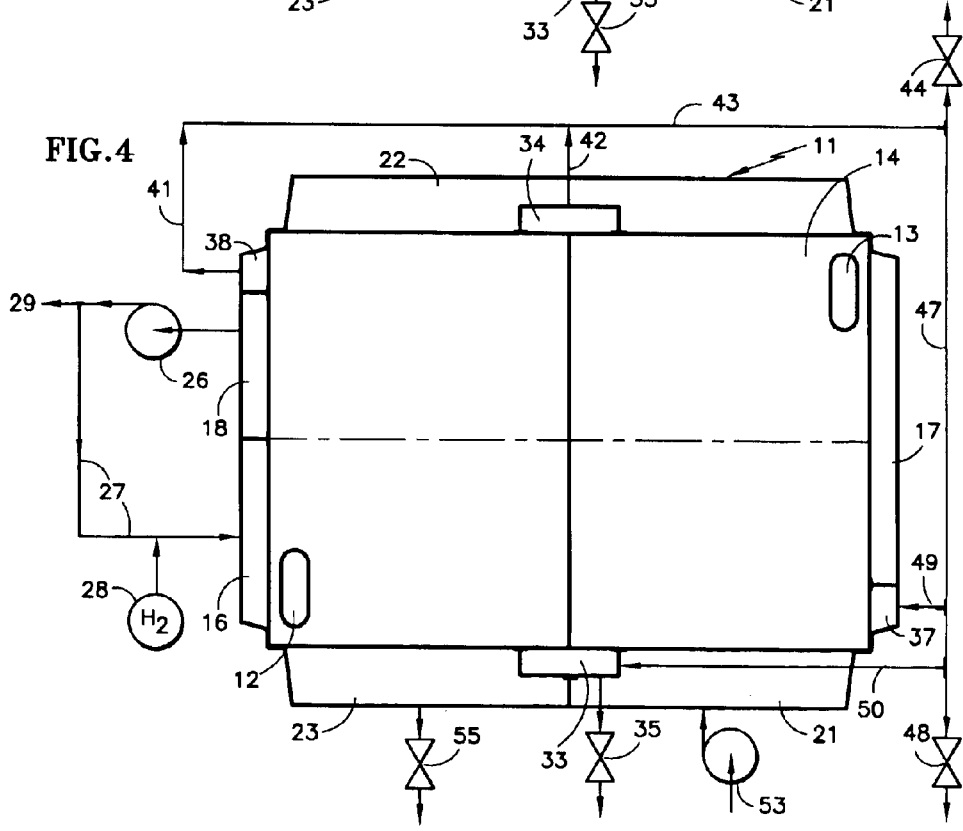

PEM FUEL CELL PASSIVE WATER MANAGEMENT

TECHNICAL FIELD

This invention relates to proton exchange membrane (PEM) fuel cells in which no water pump is provided, water inlet being at the bottom of the fuel cell stack and water outlet being at the top of the fuel cell stack, with or without circulation of the water, and with venting of gas bubbles from reactant leakage through porous water transport plates.

BACKGROUND ART

Conventional PEM fuel cells may employ a water management system which includes porous water transport plates which have reactant gas on one side and water on the other side. Such systems generally include a water pump, and an accumulator, together with a gas separator which is required for effective pumping with low cost pumps. The accumulator takes up space which is scarce, particularly in electric vehicles powered by a fuel cell. Furthermore, the parasitic power requirement of the electric pump detracts from the overall efficiency of the fuel cell process.

Furthermore, when a PEM fuel cell is to be utilized in environments in which the cell stack may fall below the freezing temperature of water, the removal of water at shutdown is a requirement, which is mitigated if less water has to be removed. Additionally, startup in such a system with a frozen pump and conduits can be extremely difficult if not impossible.

DISCLOSURE OF INVENTION

Objects of the invention include a PEM fuel cell stack which does not require a mechanical water pump or a water accumulator; a PEM fuel cell of greater efficiency; a PEM fuel cell which is more suited to use in environments in which the temperature is liable to carry the fuel cell stack below the freezing temperature of water; a PEM fuel cell stack having reduced parasitic power; improved PEM fuel cell stack.

The invention is predicated partly on the realization that a fuel cell having porous water transport plates will have some frozen water released almost immediately upon startup of the fuel cell, whereby the need for water in an accumulator is avoided, thereby avoiding further the need for a pump.

According to the present invention, PEM fuel cell stacks having reactant gas flow fields, water flow fields, and coolant flow fields, the coolant being an antifreeze solution, utilize passive water management, accomplished without a mechanical water pump or other ancillary water moving means. As used herein, "mechanical pump" means any pump or turbine known in the art, such as centrifugal pumps or positive displacement pumps.

A fuel cell stack of the invention is operated without a mechanical water pump by allowing reactant gas bubbles, which leak through porous plates into the water stream, to escape through a vent in communication with at least one water outlet manifold at the top of the stack.

According to the invention in one form, the water flow fields which are adjacent to the oxidant flow fields have water inlet manifold and water outlet manifold which are separate from the water inlet and outlet manifolds of the water flow fields which are adjacent to the fuel flow fields.

According to one form of the invention, water exiting from the water outlet manifolds is returned by convection to the water inlet manifolds, the water pumping being enhanced by bubble pumping, that is, the fact that the fluid flowing within the water channels has a lower effective density due to the presence of gas bubbles therein, whereas the water external of the stack has a higher density due to the venting of gas therefrom, and due to the cooler temperature thereof.

An enhancement uses a hydrophobic band or hydrophobic spots in the porous plates to control leakage of gas, to thereby ensure adequate flow to provide wetting of the porous plates.

Another enhancement uses a heat exchanger (a cooler) in the external portion of the circulation loop to provide a temperature differential to ensure adequate flow. In one embodiment of this form, the level of water in the stack is controlled by a controller which monitors the variation of water level in a stand pipe from a reference level to control either or both of the degree of cooling of the coolant in the coolant channels or the rate of flow of water in the water channels, or both, as well as to control the total water inventory within the system. In accordance with the invention in another form, there is no external flow of water, the water simply filling from the bottom upwardly until it pools through the entire stack, any excess being vented overboard along with reactant gas bubbles.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 3 is a stylized, end elevation of a fuel cell stack, illustrating the flow of water on the anode side of each fuel cell.

FIG. 4 is a stylized, end elevation of a fuel cell stack, including an external water circulation loop.

MODE(S) FOR CARRYING OUT THE INVENTION

Figure 1:
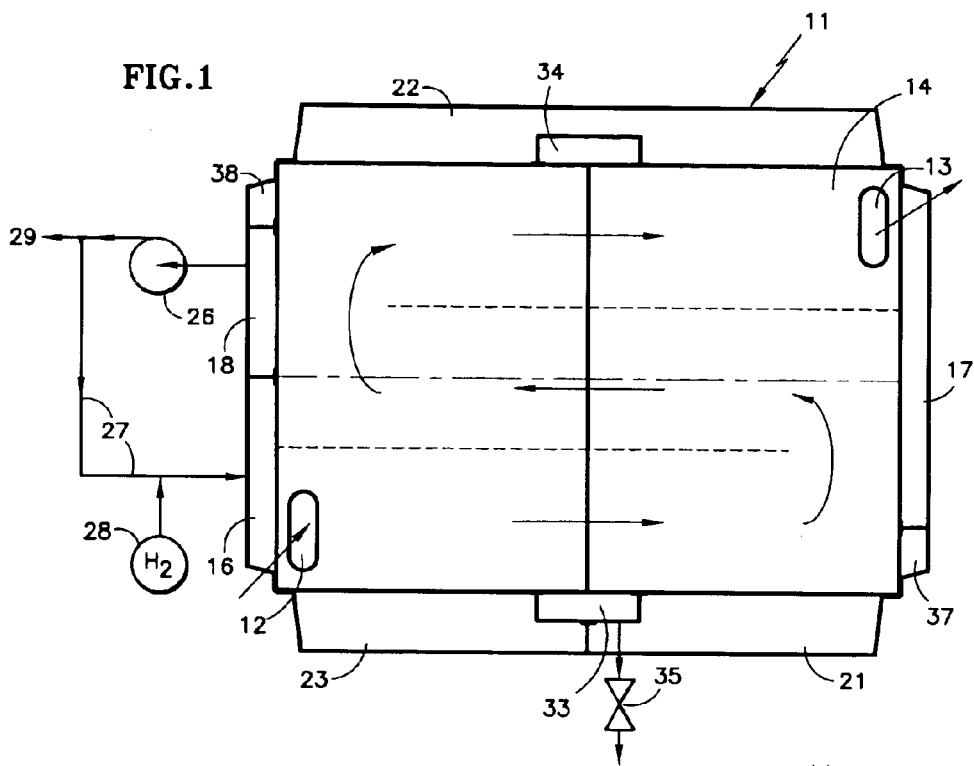
FIG. 1 is a stylized, end elevation of a fuel cell stack, illustrating the flow of coolant through each cell of the stack.

In a fuel cell stack illustrated in FIG. 1, all of the fluids have multi-pass flow fields. Specifically, the fuel cell stack 11 has an internal coolant inlet manifold 12, and an internal coolant exit manifold 13. The coolant therein flows through each fuel cell 14 from the inlet manifold 12 to the right, and then flows through the center of the fuel cell toward the left, whereupon it flows rightwardly toward the coolant exit manifold 13, in generally-S-shaped channels, the direction of flow being demarcated by the arrows and dotted lines in FIG. 1. There may be on the order of 18–24 coolant channels in each of the three coolant flow paths demarcated by the dotted lines of FIG. 1.

The fuel cell has an inlet manifold 16 for fuel reactant gas, which may be hydrogen or a hydrogen-rich stream obtained by reforming a hydrocarbon. Fuel flow fields in each fuel cell comprise fuel flow channels on one surface of a porous anode plate, which extend between the manifolds 16 and 17 and between the manifolds 17 and 18. The fuel flows from the fuel inlet manifold 16 rightwardly to the fuel turnaround manifold 17 where it flows upwardly, after which it flows leftwardly to the fuel exit manifold 18; the rightward and leftward flow channels being demarcated by a horizontal dash-dot line in the center of the fuel cell.

The fuel cell 11 also has an oxidant inlet manifold 21, for oxidant reactant gas, which may be oxygen but is more typically air, an air turnaround manifold 22, and an air exit manifold 23. Oxidant flow fields in each fuel cell comprise oxidant flow channels which extend between the manifolds 21 and 22 and between the manifolds 22 and 23. The air flows from the oxidant inlet manifold 21 upwardly to the oxidant turnaround manifold 22 where it flows to the left, and then flows downwardly to the oxidant exit manifold 23, the upward and downward flow passes being demarcated in FIG. 1 by a vertical solid line in the center of the fuel cell 11.

Figure 2:
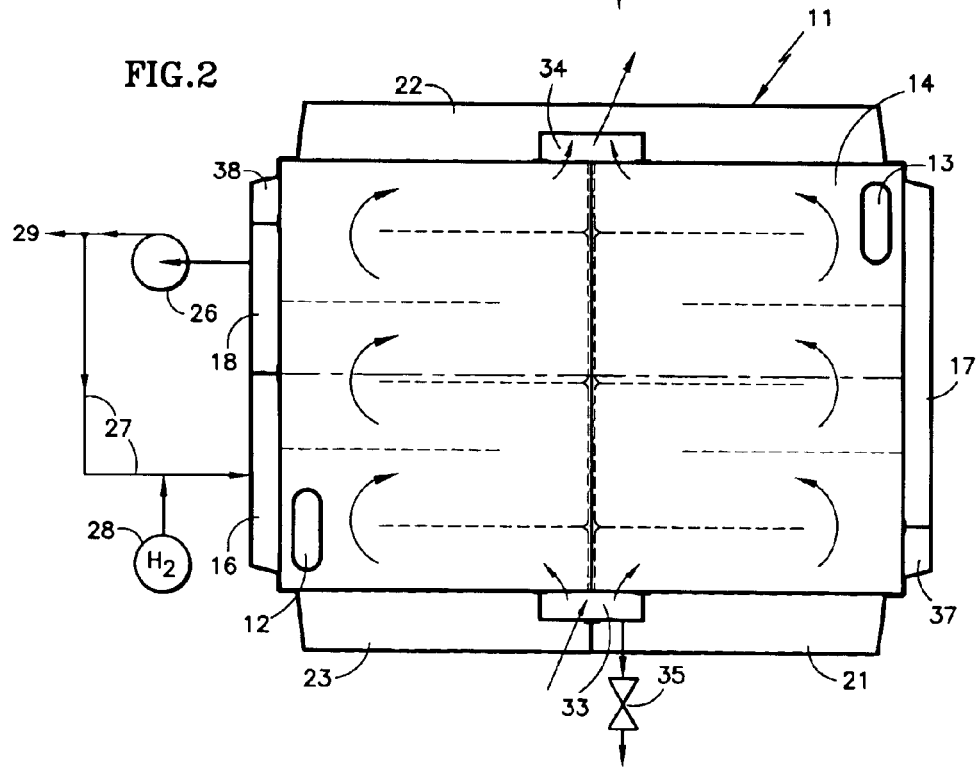
FIG. 2 is a stylized, end elevation of a fuel cell stack, illustrating the flow of water on the cathode side of each fuel cell.

In FIG. 2, the fuel cell stack also has a water inlet manifold 33 at the bottom of the fuel cell stack 11, for water flow fields that are on the opposite surface of the porous plate from the oxidant gas flow fields. There may be 16–18 water flow channels in each of the paths demarcated by the horizontal dotted lines in FIG. 2. The flow of water within water channels on the oxidant plates, from the inlet manifold 33 to the outlet manifold 34 is illustrated by the arrows and dotted lines in FIG. 2.

In FIG. 3, the fuel cell stack 11 also has a water inlet manifold 37 and a water outlet manifold 38 for water flow fields which are on a surface of a porous plate opposite to the surface having the fuel reactant gas flow fields. The flow of water in the water channels on the fuel plates, from the water inlet manifold 37 to the water outlet manifold 38 is shown by the arrows and horizontal dotted lines in FIG. 3. There may be 12–16 water flow channels in each of the flow paths denoted by the dotted lines in FIG. 3.

In the embodiment of FIGS. 1–3, product water is passed from the cathode through the ion exchange membrane to the anode by osmosis (due to higher concentration of water on the cathode side than the anode side). This will work well with thin membranes now in use for moderate current densities; in a vehicle powered by a fuel cell power plant, high current densities are only momentary and dry out of the anode will not occur in such short times.

One simple embodiment of the invention is illustrated in FIG. 4. Therein, the fuel side water exit manifold 38 is connected by a line 41 with a line 42 from the oxidant side water outlet manifold 34, into a line 43 and a vent valve 44. From the vent valve 44, a line 47 connects to a drain valve 48, there being a line 49 connecting the line 47 to the fuel side water inlet manifold 37 and a line 50 connecting the line 47 to the oxidant side water inlet manifold 33. In this embodiment, when the fuel cell stack 11 is started, product water, generated by the fuel cell reaction, begins to build up and fills all of the channels in the oxidant plate water flow fields (FIG. 2) and in the fuel plate water flow fields (FIG. 3). When sufficient water is produced, water will exit through the exit manifolds 34, 38 into the lines 41, 42, 43 and vent outwardly through the valve 44.

In this process, because the oxidant reactant gas channels are each on a side of a porous plate opposite from the water flow channels, and the structure of the porous plates are selected so as to have a bubble pressure of on the order of 35–50 kPa, there are inevitably defects that, at operating pressure differentials of 7–14 kPa, leak some gas from the reactant gas flow channels through the porous plate into the corresponding water flow channels. This, along with the higher temperature of the water within the fuel cell stack compared with water outside the stack, renders the effective density of the flowing fluid (gas plus water mixture) within the water channels inside of the fuel cell stack less than the density of the water, minus the gas bubbles, in the lines 47, 49 and 50. Thus, there will be a natural convective flow from the water inlet manifolds 33, 37 to the corresponding water outlet manifolds 34, 38, and a downward flow through the exterior lines, particularly the line 47.

This process will cause the gas bubbles to be carried out of the stack, which in the prior art is accomplished by pumping of the water through the stack by means of a mechanical pump. Since each gas bubble helps in maintaining the natural convective circulation of the water, the system is self-healing because the water will automatically flow to the plates with the highest gas bubble flow. Because the gas bubbles are moving, dry-out at any one spot on the planform does not last very long, so that loss of reactant through the dried-out (water-free) spot on the planform of the porous plate is only momentary, thereby having insignificant effect on the fuel cell process. The gas bubbles will, of course, exit through the vent valve 44. In the event that mixing of fuel and oxidant leakage gas together is to be avoided, the lines 41 and 42 may be separately vented before being joined to the line 47; however, the oxidant side water inlet manifold 33 should be interconnected with the fuel side water inlet manifold 37 so that product water generated at the cathode is routed to humidify the anode.

In the embodiment of FIG. 4, since the water channels are vented to ambient and are therefore operating at essentially atmospheric pressure, the pressure differential that is required to cause water to be forced from the fuel and oxidant reactant gas channels through the porous plates into the water flow channels, must be provided by pressurizing the hydrogen to between about 120 kPa (17 psia) and 180 kPa (26 psia). Similarly, the oxidant, typically atmospheric air, need be pressurized to substantially the same pressure as the fuel, which is easily achieved by means of a blower or compressor 53 working against the back pressure of a flow restriction, such as a valve 55. The drain valve 48 may be used to drain the water from the water channels and conduits 41–43, 47, 49 and 50 in any case where the environment of the fuel cell stack may fall below the freezing point of water, which may be common in a fuel cell stack used to power an electric vehicle.

In another embodiment the vent valve 44 may be a back-pressure regulator that maintains the pressure in the water channels at a predetermined pressure above ambient pressure. The fuel and oxidant reactant gases should be provided to the reactant gas channels at a pressure differential of 20–80 kPa (2–11 psia) above the pressure in the water flow fields.

Figure 5:
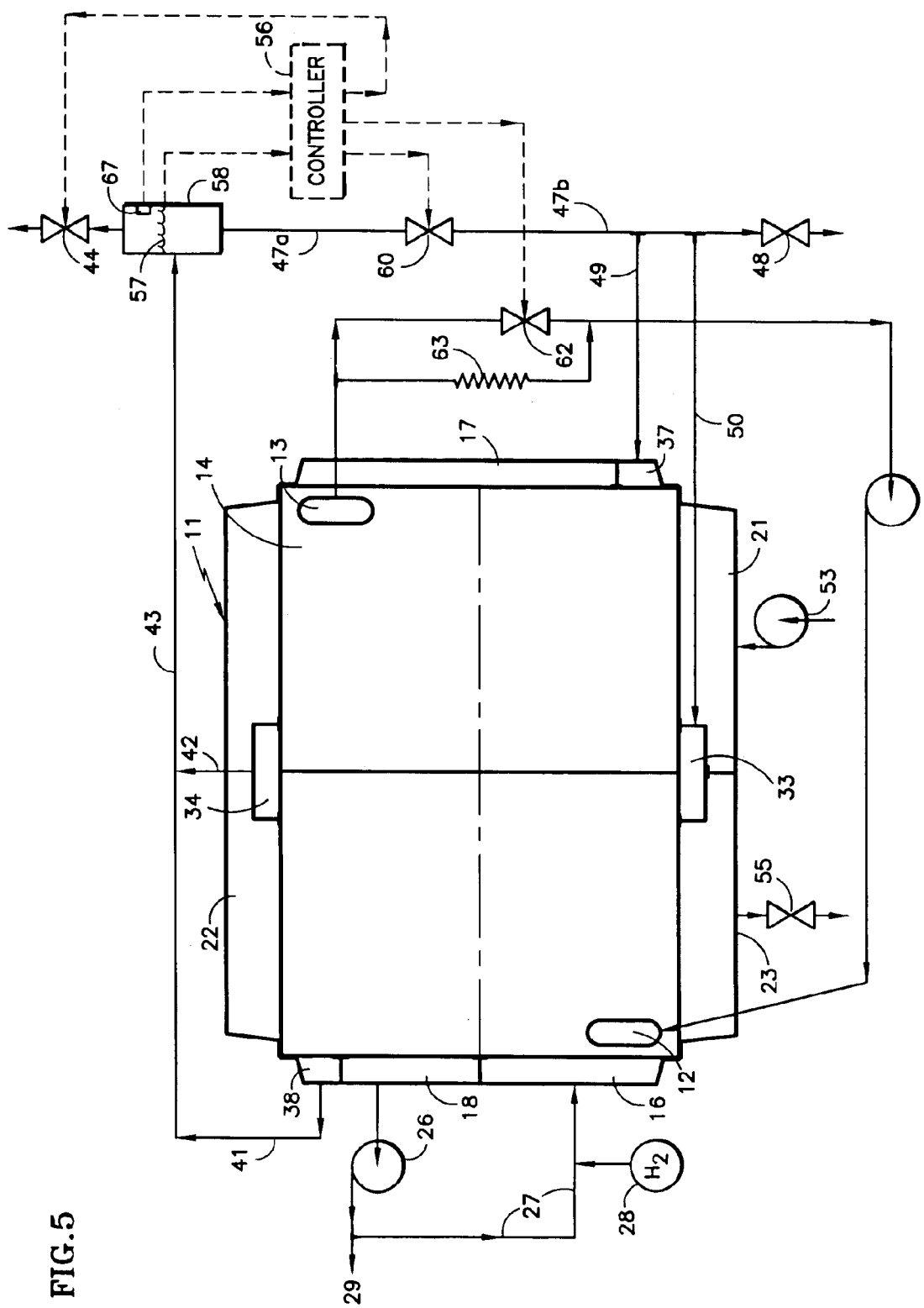
FIG. 5 is a stylized, end elevation of a fuel cell stack, including control over water flow or coolant flow to control the amount of water in the cell stack.

Another embodiment of the invention illustrated in FIG. 5 utilizes a controller 56 to sense the level of water in a stand pipe 58 which is suitably positioned (the position in FIG. 5 being schematic only). When the water level in the stand pipe 58 drops below the reference level 57, either or both of the coolant flow and coolant temperature may be adjusted to further cool the cell, thereby to recover more water.

A preferred way of controlling the water level in the stack is to control the temperature. The controller 56 will operate a valve 62 to determine how much coolant will bypass a heat exchanger 63 (such as the radiator of an electric vehicle powered by the fuel cell stack 11). If the water level goes down, the flow through the valve 62 is curtailed somewhat, thereby cooling the coolant flow from the coolant inlet 12 to the coolant outlet manifold 13, thereby causing more water to remain in the stack. Conversely, if the water level in the stand pipe 58 increases above the reference level 57, the controller 56 will open the valve 62 somewhat, so that the coolant will have an increase in temperature as it flows through the stack 11, whereby less water will be retained. If desired, both valves 60, 62 may be controlled.

Figure 6:
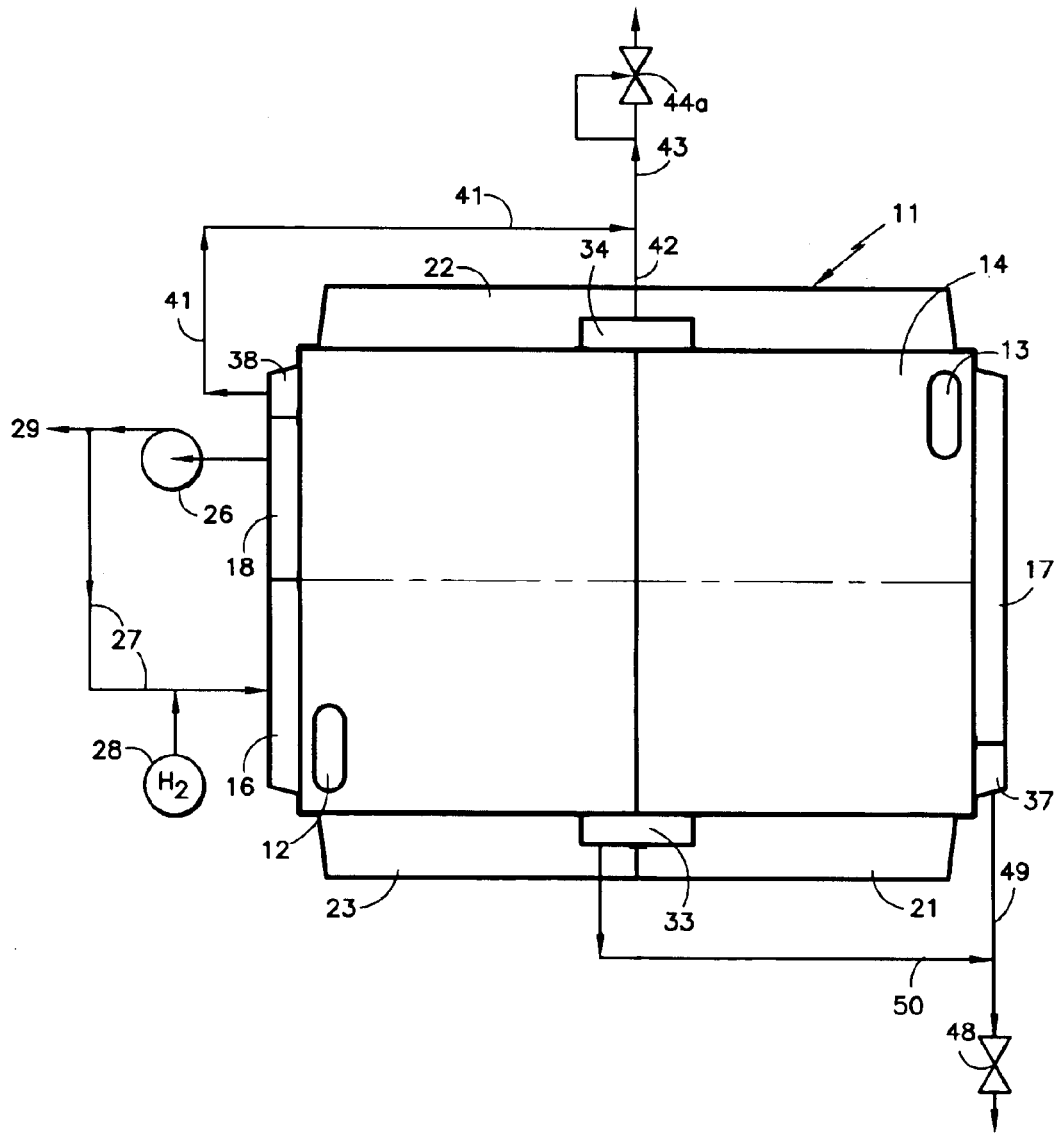
FIG. 6 is a stylized, end elevation of a fuel cell stack, including a pressure regulator to allow water pressures in excess of ambient pressure.

Another embodiment of the invention is illustrated in FIG. 6. Therein, the water outlet manifolds 34, 38 are not connected with a return line to the water inlet manifolds 33, 37. Instead, the product water is allowed to pool upwardly through the stack as it is generated, any excess escaping along with reactant gas bubbles through the valve 44a. The valve 48 is utilized to drain water from the water flow fields. In this embodiment, the natural tendency of the bubbles to flow upwardly keeps the bubbles moving, thereby avoiding dry out at any particular spot of any of the water flow field channels, and thereby also avoiding fuel or oxidant starvation at such points. This embodiment operates with the water at ambient pressure, thereby requiring that the pressure of the fuel as well as of the oxidant be on the order of 120 kPa (17 psia)–180 kPa (26 psia) above ambient, as in the previous embodiments.

In FIG. 6, the valve 44 is shown as being a pressure regulating valve 44a. Use of a pressure regulating valve will allow the fuel cell stack to be operated with water pressures above ambient. Examples include operating the fuel and oxidant reactant gases at a pressure of about 170 kPa (22.5 psi) and the water pressure at 150 kPa (21 psia), in an ambient environment of 100 kPa (14.7 psia). Another example is operating the fuel and oxidant reactant gases at a pressure of 130 kPa (19 psia) with water pressure at ambient. Still another example includes operating the fuel and oxidant reactant gases at about 115 kPa (16.4 psia) with water at ambient pressure. Of course, the invention is independent of the pressures at which a fuel cell power plant is run, which may be run at various combinations of pressures.

As illustrated in FIG. 5, the controller may respond to a pressure sensor 67 to control the setting of the valve 44, thereby to control the pressure of water within the fuel cell stack. The pressure may be controlled in other, conventional ways as well, in any of the embodiments herein.

Figure 7:
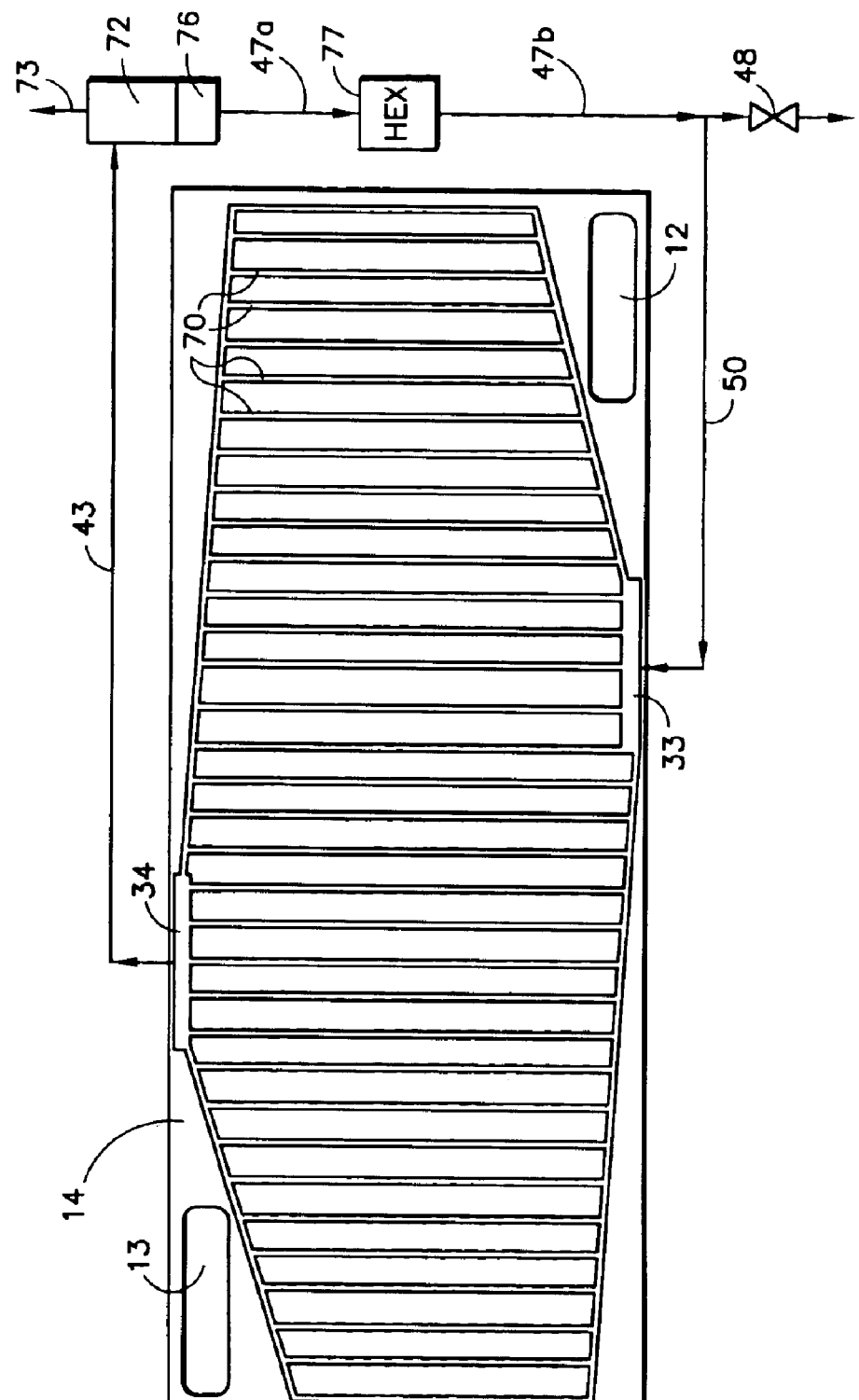
FIG. 7 is an alternative embodiment utilizing vertical water flow channels and an exterior heat exchanger in the water circulation loop.

The embodiment of FIG. 7 illustrates vertical water channels on a surface of a cathode porous plate. Vertical channels enhancing the upward flow of water through the fuel cells, in contrast with the six-pass, partly horizontal water flow channels illustrated by the dotted lines and arrows in FIG. 2. In FIG. 7, to enhance circulation, a gas separator 72 ensures that bubbles are removed through a vent 73 so that only water will flow from the bottom 76 of the gas separator 72 downwardly through the line 47a to a heat exchanger 77. The heat exchanger 77 may simply be a coil of conduit having a vertical axis, or it may be a tube and fin heat exchanger of a known variety, preferably lying on its side so that ambient air will tend to pump air through it as a consequence of being heated up in the heat exchanger 77. Then the water will flow through the line 47b to the valve 48 and through the line 50 to the water inlet manifold 33. Cooling of the water in the heat exchanger 77 is enhanced by the fact that all gases are removed therefrom in the gas separator 72. With the water being much cooler in the line 47b, 50, than it is in the coolant flow channel 70, adequate pumping of water will assure removal of bubbles and circulation of water, so there is generally only temporary dry spots which will not provide any significant gas leakage in the fuel cells.

Figure 8:
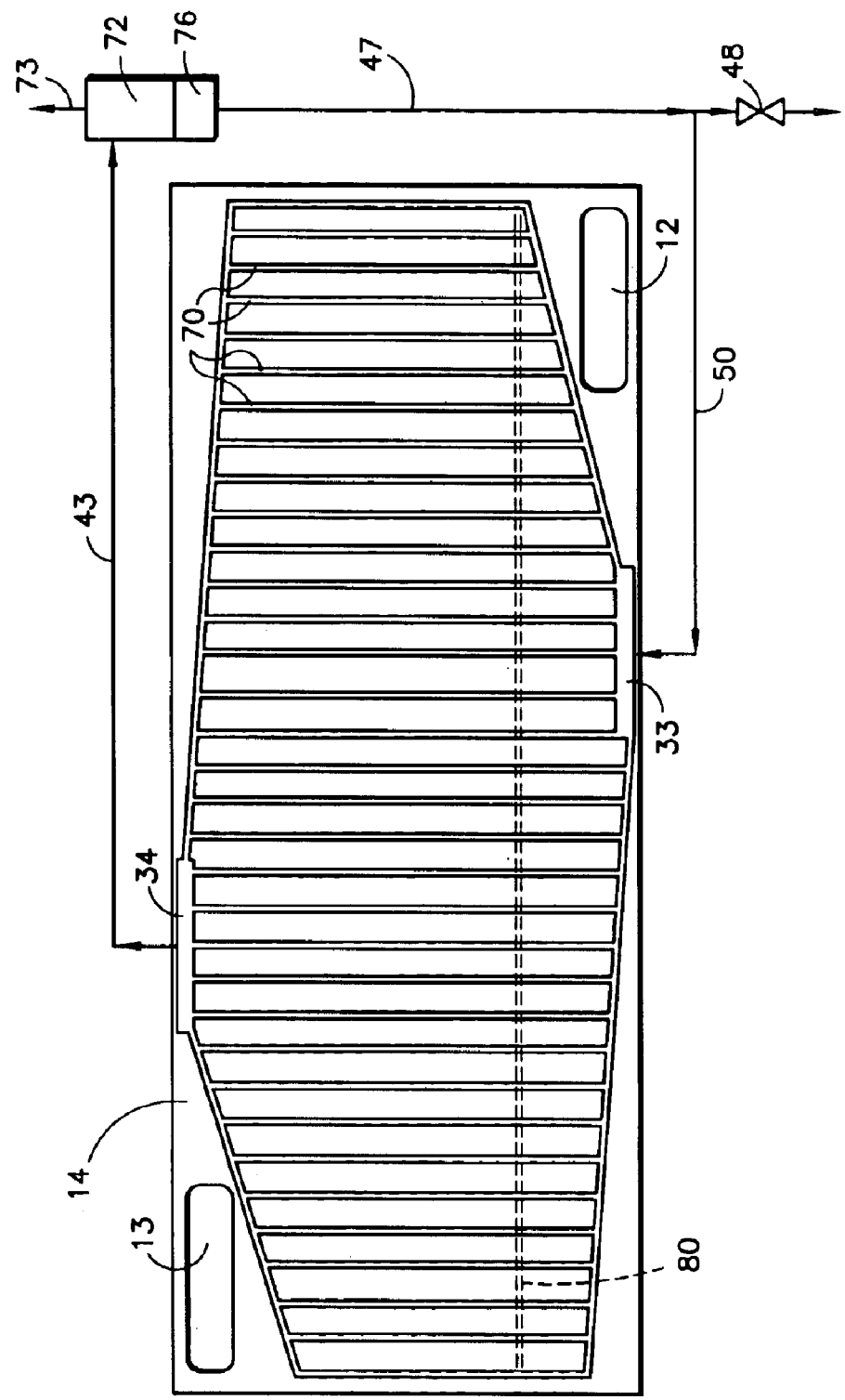
FIG. 8 is an alternative embodiment with vertical water flow channels having hydrophobic regions to ensure adequate gas leakage to cause water to flow in the external circulation loop.

In FIG. 8, a similar embodiment having vertical water channels 70 is provided with an extremely small hydrophobic band, illustrated by the double dotted line 80, extending horizontally across the entire porous anode plate 14, to enhance gas leakage into the water channel due to the pressure differential between the reactant gas and the water. Alternatively, individual spots in each water flow channel may be rendered hydrophobic. This will ensure that the average density in each of the water channels will be reduced by gas bubbles, and thereby be lower than the density in the lines 47 and 50 which has the gas removed therefrom by the gas separator 72. Any known wetproofing material may be used to create the local hydrophobic areas, such as FEP TEFLON® and KYNAR®. The material may be applied in colloidal suspension or solution, or as a viscous ink. It may be applied by dispensing micro-drops, screen-printing, ink-jet printing or any other known means. The hydrophobic portion of the porous plate may be comprised either of a band of wetproofing or individual areas of wetproofing, as may be desired.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A PEM fuel cell power plant having passive water management, comprising:

a PEM fuel cell stack comprising plurality of fuel cells, each of said fuel cells having a membrane electrode assembly with a cathode on one side and an anode on the other side, the cathode and anode each comprising a porous flow field plate having reactant gas flow channels on one surface and water flow channels on a surface opposite to said one surface;

at least one water outlet manifold near the top of said fuel cell stack, said water flow channels extending from near the bottom of each of said fuel cells generally upwardly to said at least one water outlet manifold, thereby allowing fuel reactant gas which leaks into paid water flow channels on said anode side to bubble-pump water in said water channels on said anode side upwardly to one said at least one water outlet manifold, and allowing oxidant reactant gas which leaks into said water flow channels on said cathode side to bubble-pump water in said water channels on said cathode side upwardly to one said at least one water outlet manifold;

at least one vent connected to said at least one water outlet manifold to allow venting of fuel and oxidant gas from said fuel cell stack, whereby water management in said fuel cell stack is effected without a mechanical pump;

at least one water inlet manifold disposed at the base of said fuel cell stack, said water channels extending from said at least one water inlet manifold generally upwardly to said at least one water outlet manifold; and conduits connecting said at least one water inlet manifold with said at least one water outlet manifold, whereby said water flows through said stack by natural convection.

2. A power plant according to claim 1 wherein:

said at least one vent comprises part of a gas separator.

3. A power plant according to claim 1 wherein said conduits include a controllable valve, and further comprising:

means for controlling said controllable valve in response to the level of water in said fuel cell stack, whereby to control the amount of water in said stack.

4. A power plant according to claim 1 further comprising:

a plurality of coolant flow plates interspersed between at least some of said fuel cell, each having coolant flow channels therein;

a coolant flow system in fluid communication with said coolant flow channels, said coolant flow system including a radiator for cooling the coolant and means responsive to the level of water in said fuel cell stack for controlling the cooling of coolant in said coolant flow system.

5. A power plant according to claim 1 further comprising:

a hydrophobic portion on at least one of said porous plates, thereby to ensure gas leakage sufficient to provide adequate bubble-pumping of a water/gas mixture in said water channels of said at least one porous plate.

6. A power plant according to claim 1 further comprising:

a heat exchanger in said conduits thereby providing sufficient differential density between water in said conduits and water in said water channels to ensure convective flow of water/gas mixture in said water flow channels.

7. A power plant according to claim 1 further comprising:

a gas separator connected to at least one of said water outlet manifolds to remove gas from a water/gas mixture flowing in said water channels connected to said at least one water outlet manifold.

* * * * *